United States Patent
Ikeda et al.

(10) Patent No.: US 6,426,580 B1
(45) Date of Patent: *Jul. 30, 2002

(54) VEHICULAR AC GENERATOR

(75) Inventors: Ryuichi Ikeda; Katsumi Adachi, both of Hyogo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,635

(22) Filed: Apr. 10, 1997

Related U.S. Application Data

(63) Continuation of application No. 08/331,094, filed on Oct. 28, 1994, now abandoned.

(30) Foreign Application Priority Data

Feb. 2, 1994 (JP) .............................................. 6-011071

(51) Int. Cl.$^7$ ................................................. H02K 1/22
(52) U.S. Cl. .......................... 310/263; 310/261; 310/51; 310/58; 310/257
(58) Field of Search .......................... 310/201, 62, 263, 310/267

(56) References Cited

U.S. PATENT DOCUMENTS

| | | | | |
|---|---|---|---|---|
| 3,749,953 A | * | 7/1973 | Baumann et al. | 310/62 |
| 4,115,030 A | * | 9/1978 | Inagaki et al. | 416/93 R |
| 4,186,317 A | * | 1/1980 | Sisk | 310/60 R |
| 4,488,070 A | * | 12/1984 | Iwaki et al. | 310/62 |
| 4,742,257 A | * | 5/1988 | Carpenter | 310/62 |
| 4,972,114 A | * | 11/1990 | Frister | 310/263 |
| 5,028,826 A | * | 7/1991 | Kitamura | 310/51 |
| 5,097,167 A | * | 3/1992 | Kanayama et al. | 310/201 |
| 5,194,770 A | * | 3/1993 | Yoshioka et al. | 310/51 |
| 5,241,230 A | * | 8/1993 | Tanaka et al. | 310/62 |
| 5,270,603 A | * | 12/1993 | Lefrancois et al. | 310/263 |
| 5,325,003 A | * | 6/1994 | Saval et al. | 310/43 |

FOREIGN PATENT DOCUMENTS

| | | |
|---|---|---|
| JP | 54-053457 | 4/1979 |
| JP | 58-87457 U | 6/1983 |
| JP | 58-150371 U | 10/1983 |
| JP | 63-29378 U | 2/1988 |
| JP | 63302742 A | 12/1988 |
| JP | 3 74163 | 3/1991 |

* cited by examiner

Primary Examiner—Elvin Enad
(74) Attorney, Agent, or Firm—Sughrue Mion, PLLC

(57) ABSTRACT

A vehicular AC generator comprising a pair of cores included in a rotor and supported by a rotating shaft, a plurality of trapezoidal-shaped claws as magnetic poles protruding on the outer periphery edges of the pair of cores, and a pair of fans attached to the front side and the rear side of the cores, at least one of the fans having an outer diameter in the range between 85% and 96% of the outer diameter of each of the cores, each of the claws having a tapered portion for gradually decreasing the outer diameter of a shoulder portion of the claw in the direction toward the end surface of the core so that the outer diameter of at least one of the cores faced to the at least one of the fans becomes substantially the same as the outer diameter of the at least one of the fans, whereby the sound caused by cutting wind by the rotation of the centrifugal fans can be reduced without deteriorating the cooling efficiency of the coil ends of the stator.

13 Claims, 12 Drawing Sheets

DIRECTION OF ROTATION

OUTER DIAMETER OF
SIDE PLATE AND
CENTRIFUGAL FAN/OUTER
DIAMETER OF ROTOR (%)

FIG. 11

OUTER DIAMETER OF
SIDE PLATE AND
CENTRIFUGAL FAN/OUTER
DIAMETER OF ROTOR (%)

NOISE LEVEL (dB)

ROTATING SPEED (r/min)

DIRECTION OF ROTATION

VEHICULAR AC GENERATOR

This is a Continuation of application Ser. No. 08/331,094 filed Oct. 28, 1994 now abandoned.

BACKGROUND OF THE INVENTION

(1) Field of the Invention

The present invention relates to a vehicular AC generator having a salient-pole-rotating stator supported by brackets.

(2) Description of the Related Art

A conventional general vehicular AC generator will be described with reference to FIG. 1 to FIG. 4. In the figures, a reference numeral 1 represents rear brackets of the generator each having an inlet opening 1a and an outlet opening 1b. A reference numeral 2 represents a rectifier, 3 is a brush holder having a regulator 3a, and 4 is a rotor consisting of a pair of cores 4a1 and 4a2 and is supported and fixed to a rotating shaft 5. A reference symbol 4b designates a plurality of trapezoidal-shaped claws functioning as magnetic poles periodically protruding from the edges of the outer peripheries of the cores 4a1 and 4a2. The claws 4b of the core 4a1 and the claws 4b of the core 4a2 are alternately arranged in such a way that each of the claws belonging to one of the pair of cores is arranged in a concave portion between adjacent two of the claws belonging to the other one of the pair of cores. A reference numeral 6 is a coil field accommodated within both of the cores 4a1 and 4a2. Reference symbols 7a and 7b designate centrifugal fans respectively attached to the side surfaces of the cores 4a1 and 4a2. Reference numeral 8 represents a stator arranged on the outer periphery of the rotor 4, and consisting of a core 8a and coil ends 8b and 8c. Reference numeral 9 is a front bracket having an inlet opening 9a for sucking outside air and an outlet opening 9b for exhausting air. Reference numerals 10a and 10b represent bearings for supporting the rotating shaft 5.

Figure 1:
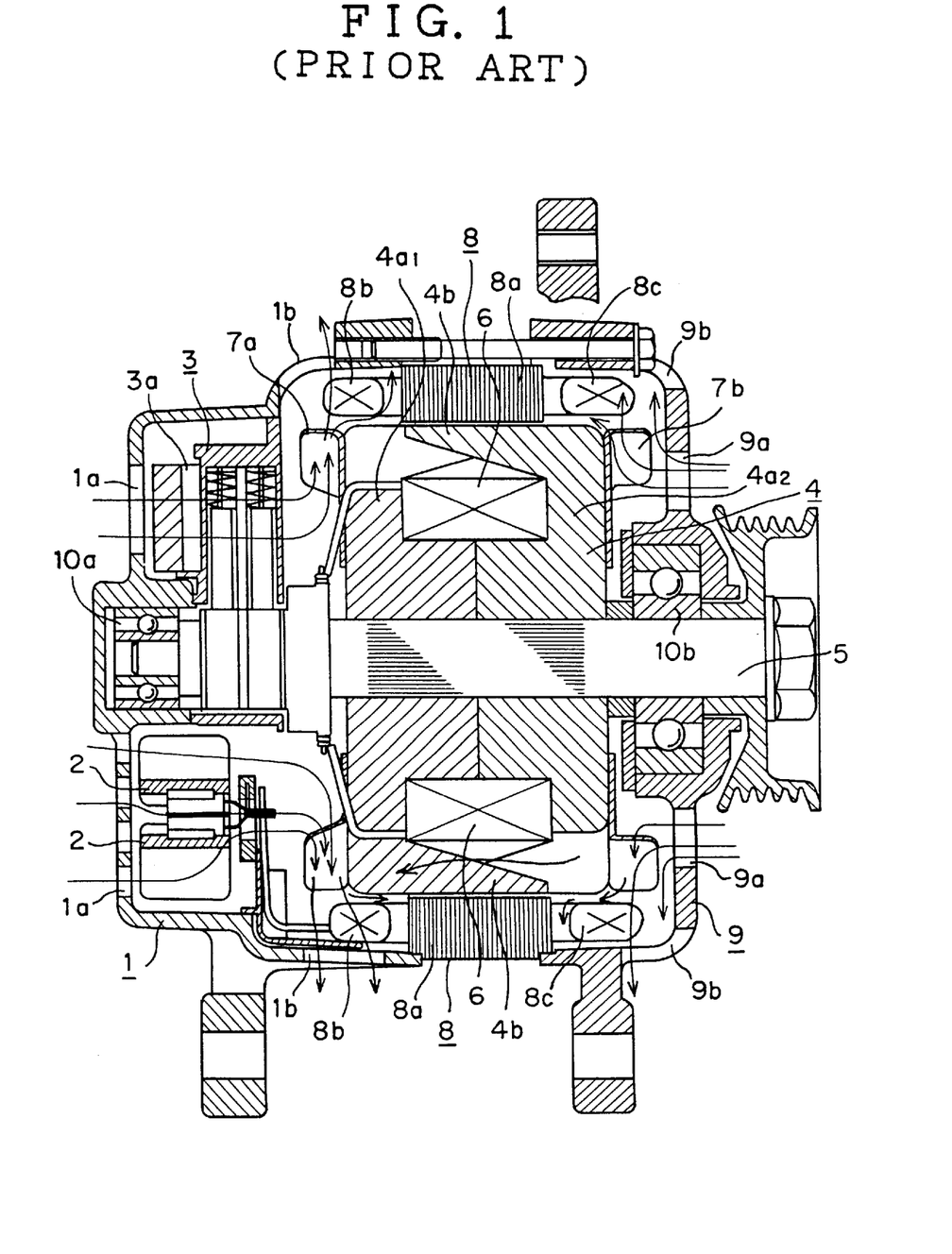
FIG. 1 is a cross-sectional view showing a general vehicular AC generator in its shaft direction.
Figure 2:
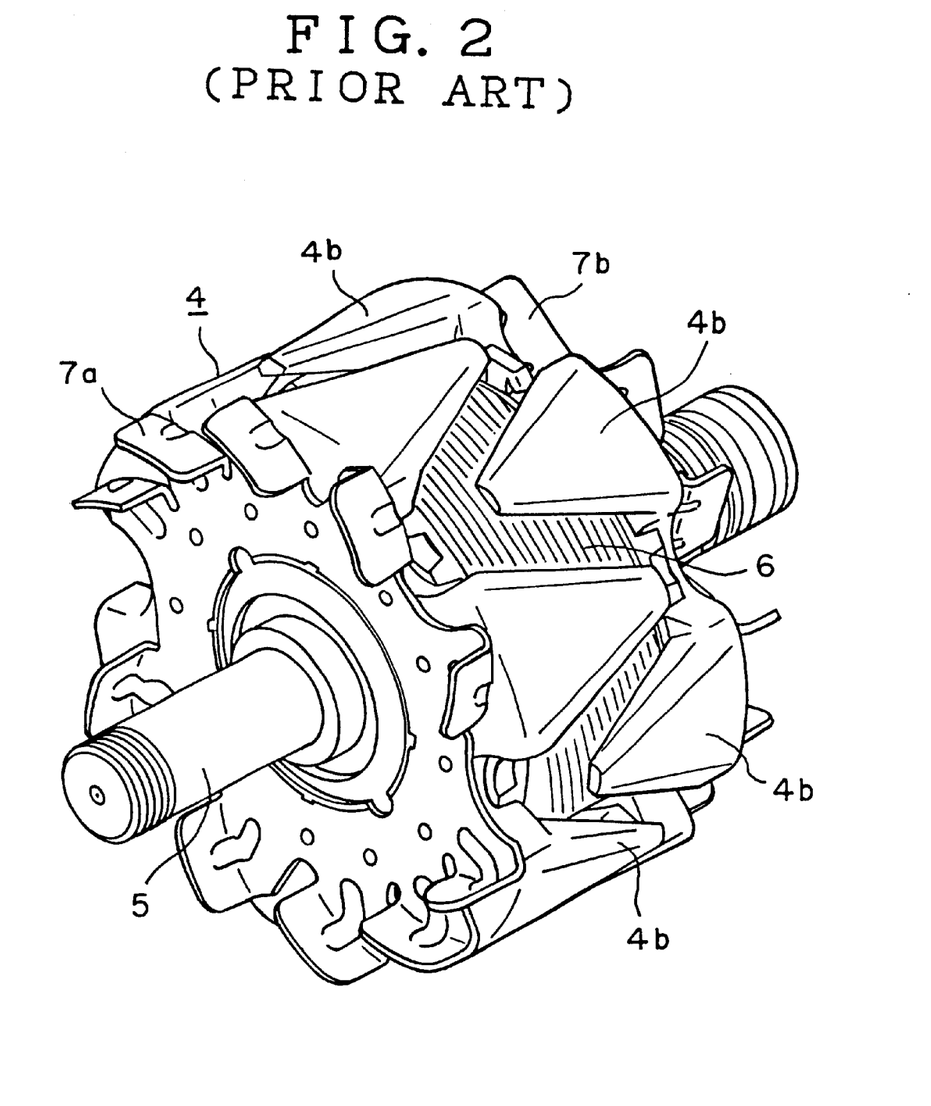
FIG. 2 is a perspective view showing a rotor in FIG. 1.
Figure 3:
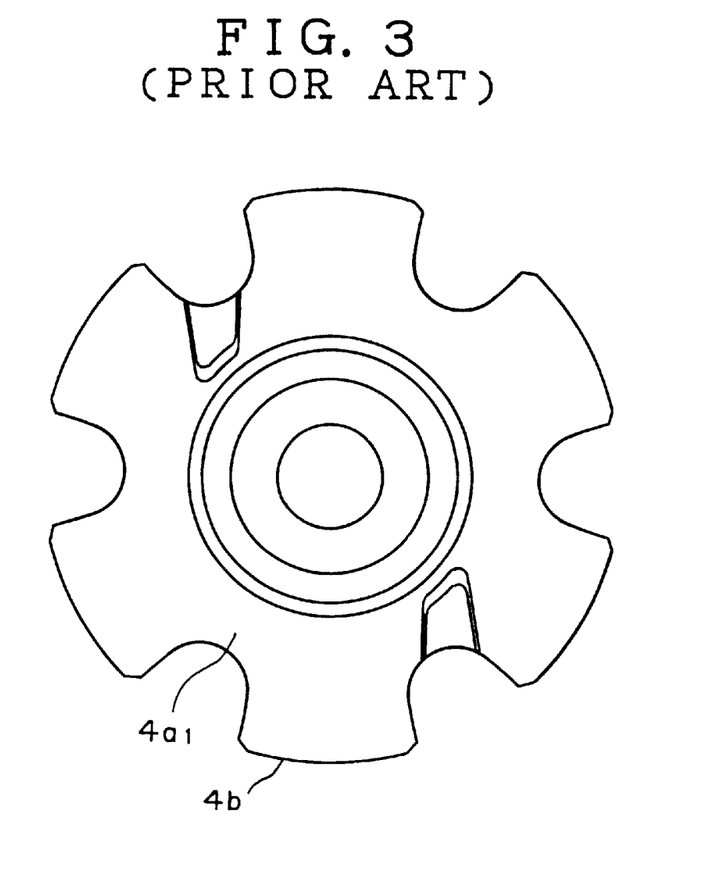
FIG. 3 is a plan view showing a core in FIG. 2.
Figure 4:
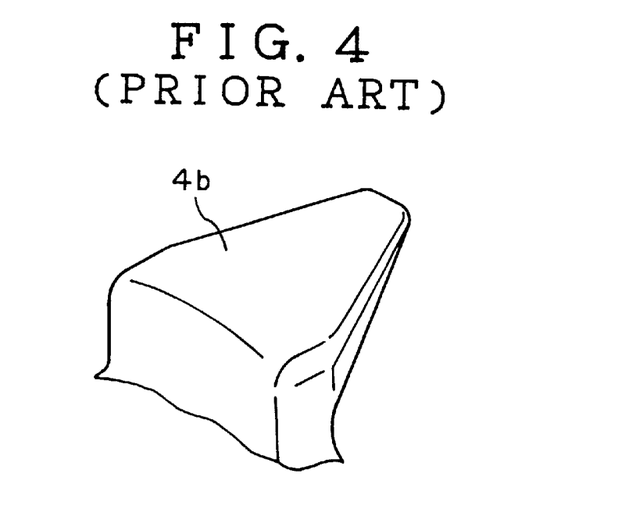
FIG. 4 is a perspective view showing a claw of the core shown in FIG. 3.

Next, in the vehicular AC generator constructed as above, a cooling channel will be described. First, outside air is sucked from the rear bracket 1 through the inlet opening 1a to cool the rectifier 2 and the regulator 3a. Then, the cooling air is strongly sucked by the centrifugal fans 7a to be bent so as to cool the coil end 8b of the rear side of the stator 8, and is exhausted from the outlet opening 1b. On the other hand, outside air from the front bracket 9 is flown through the inlet opening 9a and is separated to be flown into two channels, i.e., on one hand, is sucked by the centrifugal fans 7b to be bent so as to cool the coil end 8b of the front side of the stator 8 and is exhausted from the outlet opening 1b, and on the other hand, to cool the coil field 6 and then is flown to the rear side and is exhausted from the outlet opening 1b.

In such a general type of the conventional vehicular AC generator, since the gap between the outer periphery surface of the shoulder portion of each of the claws 4b and the coil end 8b or 8c is small, and since the inner surfaces of the coil ends 8b and 8c are irregular, there is a problem in that ragged sound caused by cutting wind (interfering sound between the coils 4a1 and 4a2 and the coil ends 8b and 8c) is generated.

A prior art AC generator to solve such a problem is disclosed in, for example, Japanese Laid Open Patent Application (Kokai) No. 1-74163/89. This prior art AC generator will be described with reference to FIG. 5.

Figure 5:
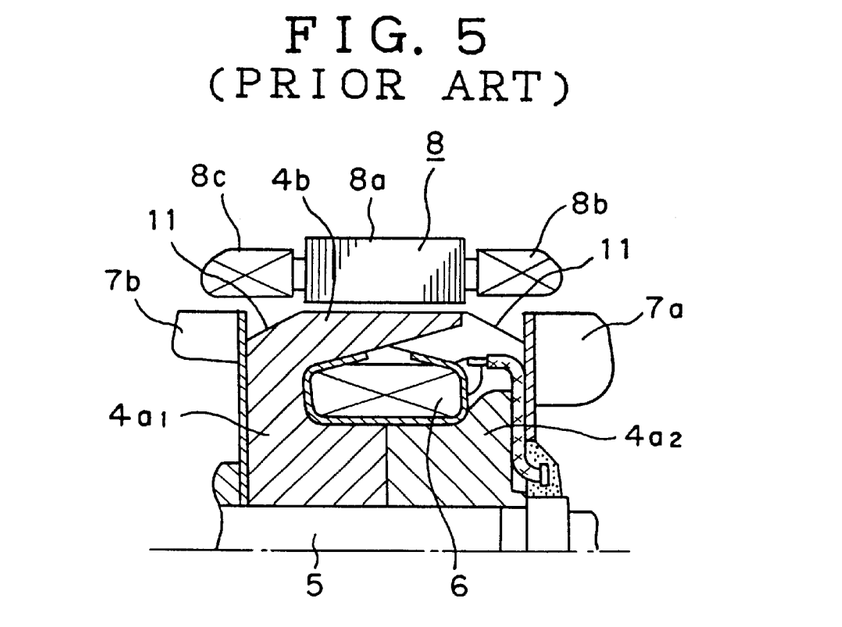
FIG. 5 is a cross-sectional view showing a prior art vehicular AC generator in its shaft direction.

In FIG. 5, the same parts as those in the above-described conventional general AC generator are denoted by the same reference symbols, and the explanation thereof are omitted here. Reference numeral 11 designate tapered portions of the outer periphery surfaces of the shoulders of the claws 4b each having a sloping surface against the end surface in the shaft direction.

By forming the tapered portions 11 in the claws 4b as above, the gap between each tapered portion 11 of the outer periphery surface of the claw 4b and each of the coil ends 8b and 8c is gradually increased in the direction toward the end surface, resulting in that the interference sound generated, during the rotation of the cores 4a1 and 4a2, between each of the cores 4a1 and 4a2 and each of the coil ends 8b and 8c is reduced.

In the prior art vehicular AC generator shown in FIG. 5, although the interference noise between each of the cores 4a1 and 4a2 and each of the coil ends 8b and 8c can be reduced by the tapered portions 11 in the outer periphery surfaces of the claws 4b, however, the gap between each of the centrifugal fans 7a and 7b and each of the coil ends 8b and 8c is still kept to be narrow in order to ensure a cooling efficiency of the coil ends 8b and 8c. Because the gap between each of the centrifugal fans 7a and 7b and each of the coil ends 8b and 8c is so narrow, there is a problem in that noise sound caused by cutting wind is generated between each of the coil ends 8b and 8c and each of the centrifugal fans 7a and 7b during the rotation of the centrifugal fans 7a and 7b.

SUMMARY OF THE INVENTION

An object of the present invention is to resolve the above-mentioned problems, and to provide a vehicular AC generator in which noise sound caused by cutting wind by the rotation of centrifugal fans can be reduced.

Another object of the present invention is to provide a vehicular AC generator in which the cooling efficiency of coil ends of a stator by means of the centrifugal fans is not lowered even when the outer diameters of the centrifugal fans are made small.

Still another object of the present invention is to provide a vehicular AC generator in which noise sound caused by cutting wind by cores can be reduced by making the lowering of the output current due to the decrease of the outer diameters of centrifugal fans to be smaller.

According to the first aspect of the present invention, there is provided, for achieving the above object, a vehicular AC generator in which at least one of a pair of front and rear fans attached to the both ends of a core of a rotor has a outer diameter in the range between 85% and 96% of an outer diameter of the core.

According to the second aspect of the present invention, there is provided a vehicular AC generator having a side plate fixed to the end portion of one of the fans and having an outer diameter smaller than the outer diameter of the fan.

According to the third aspect of the present invention, there is provided a vehicular AC generator in which each of the tapered portions formed in the claws is provided in at least the front side of the direction of rotation in the width of the circumferential direction of each claw.

As stated above, according to the first aspect of the present invention, since the diameter of the fan is made to be in the range between 85% and 96% of the outer diameter of the core, noise caused by the fans themselves can be reduced, and the sound caused by cutting wind generated between the fans and the coil ends during the rotation of the fans can be reduced.

Further, according to the second aspect of the present invention, since the side plate is attached to the fan, the reduction of the amount of the cooling wind due to the decrease of the outer diameter of the fan can be prevented.

Still further, according to the third aspect of the present invention, since each of the tapered portions is provided in at least the front side of the direction of rotation in the width of the circumferential direction of each claw, the lowering of the output current due to the decrease of the outer diameter of the rotor core can be prevented.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Embodiment 1

Figure 6:
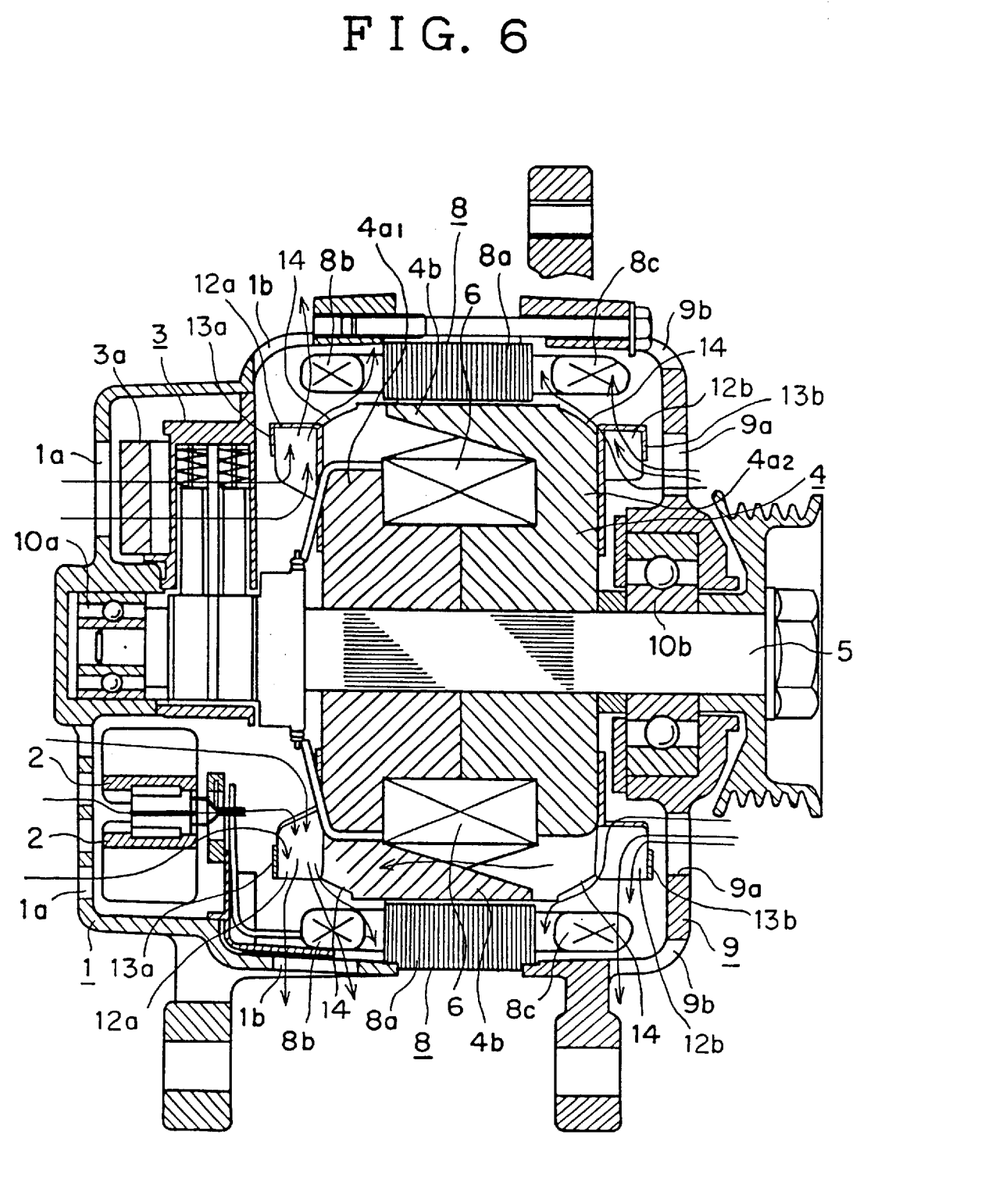
FIG. 6 is a cross-sectional view showing a vehicular AC generator in its shaft direction, according to a first embodiment of the present invention.
Figure 7:
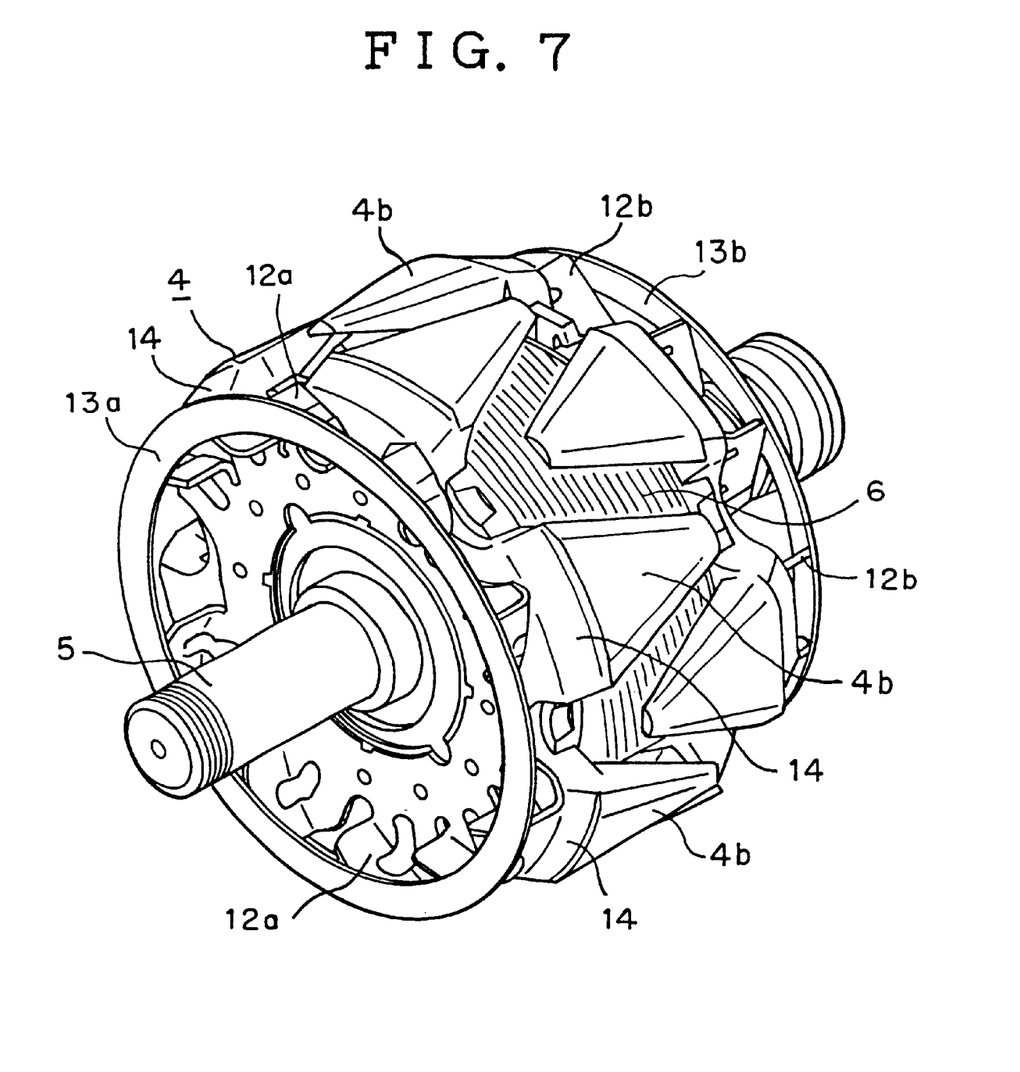
FIG. 7 is a perspective view showing a rotor in FIG. 7.
Figure 8:
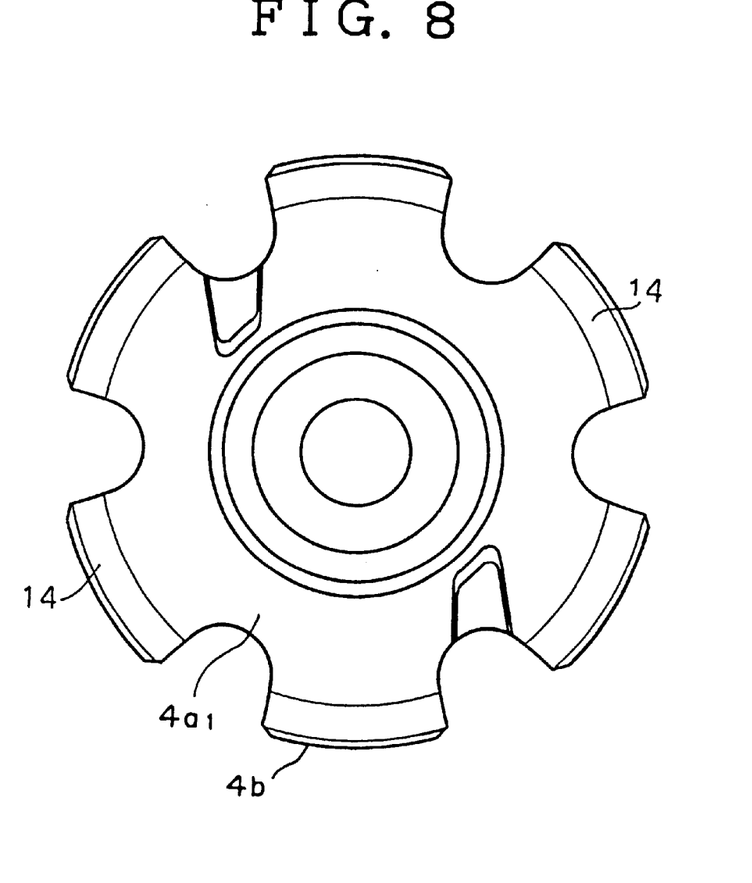
FIG. 8 is a plan view showing a core in FIG. 8.
Figure 9:
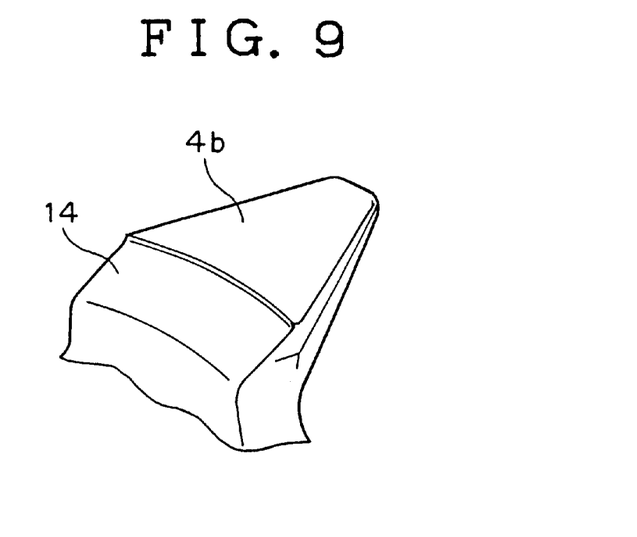
FIG. 9 is a perspective view showing a claw of the core shown in FIG. 8.

An embodiment of the present invention will be described with reference to FIG. 6 to FIG. 9. FIG. 6 is a cross-sectional view in the shaft direction; FIG. 7 is a perspective view of a rotor in FIG. 6; FIG. 8 is a plan view of a rotor core in FIG. 7; and FIG. 9 is a perspective view of a claw of the core in FIG. 8. The same as or the corresponding parts to those in the above-described prior art are denoted by the same reference symbols and the explanations thereof are omitted here.

In the figures, reference symbols 12a and 12b are centrifugal fans respectively attached to the cores 4a1 and 4a2 of the rotor 4. The outer diameter of each fan has a size of 92% of the outer diameter of each of the cores 4a1 and 4a2. Reference symbols 13a and 13b are side plates fixed to the respective ends of the centrifugal fans 12a and 12b. Each of the side plates 13a and 13b has a outer diameter equal to or smaller than the outer diameter of each of the centrifugal fans 12a and 12b. Reference numeral 14 is a tapered portion formed at a shoulder portion of the claw 4b of each of the cores 4a1 and 4a2. The tapered portion 14 is constructed in such a way that the shoulder portion of the claw 4b is made to have a sloping surface toward the end surface of the core 4a1 or 4a2 in its shaft direction so that the outer diameter of the core 4a1 or 4a2 at its end surface becomes to be almost the same as the outer diameter of each of the centrifugal fans 12a and 12b.

In such a vehicular AC generator constructed as above, outside air is flown through a cooling channel from the rear bracket 1 through the inlet opening 1a to cool the rectifier 2 and the regulator 3a, and then the cooling wind is strongly sunk by the centrifugal fan 12a to be bent at the inner side of the side plate 13a, and then it cools the coil end 8b and is exhausted from the outlet opening 1b. Since there is the side plate 13a, the cooling wind sunk by the centrifugal fan 12a is smoothly bent so that the amount of the cooling wind is not decreased even though the outer diameter of the centrifugal fan 12a is 92% of the outer diameter of the core 4a1.

On the other hand, outside air from the front bracket 9 is flown through the inlet opening 9a and is separated to be flown into two channels, i.e., a one channel through which the air is sucked by the centrifugal fan 12b to be bent through the inner side of the side plate 13b so as to cool the coil end 8c of the front side of the stator 8 and is exhausted from the outlet opening 1b, and an another channel through which the air cools the coil field 6 and then is flown to the rear side and is exhausted from the outlet opening 1b. In this case also, since there is the side plate 13b, the cooling wind sunk by the centrifugal fan 12b is smoothly bent so that the amount of the cooling wind is not decreased even though the outer diameter of the centrifugal fan 12b is 92% of the outer diameter of the core 4a2.

As described above, the cooling wind can be efficiently flown, and, in addition, since the outer diameter of each of the centrifugal fans 12a and 12b and each of the side plates 13a and 13b is made to be the size of 92% of the outer diameter of each of the cores 4a1 and 4a2, the noise sound caused by the centrifugal fans 12a and 12b themselves can be reduced. Further, since the gap between each of the centrifugal fans 12a and 12b and each of the stator coil ends 8b and 8c is expanded, the sound caused therein by cutting wind can be reduced.

Still further, since the surfaces of the outer peripheries of the claws 4b of the rotor 4 opposite to the stator coil ends 8b and 8c are made to have sloping surfaces so as to form the tapered portions 14 which are tapered toward the respective end surfaces of the rotor 4 in the shaft direction, the outer diameter of each of the cores 4a1 and 4a2 at their end surfaces in the shaft direction becomes almost the same size as the outer diameter of each of the centrifugal fans 12a and 12b and the side plates 13a and 13b, so that the gap between each of the stator coil ends 8b and 8c and each of the tapered portions 14 of the claws 4b of the rotor 4 is expanded, resulting in the reduced sound caused by cutting wind.

Figure 10:
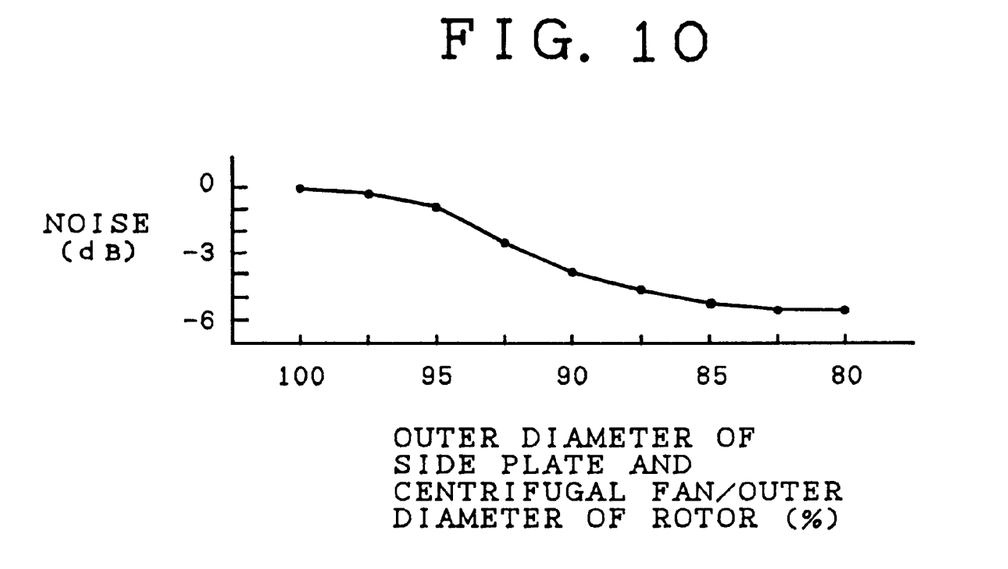
FIG. 10 is a graph showing a result of measurement of wind noise in the embodiment 1 of the present invention.
Figure 11:
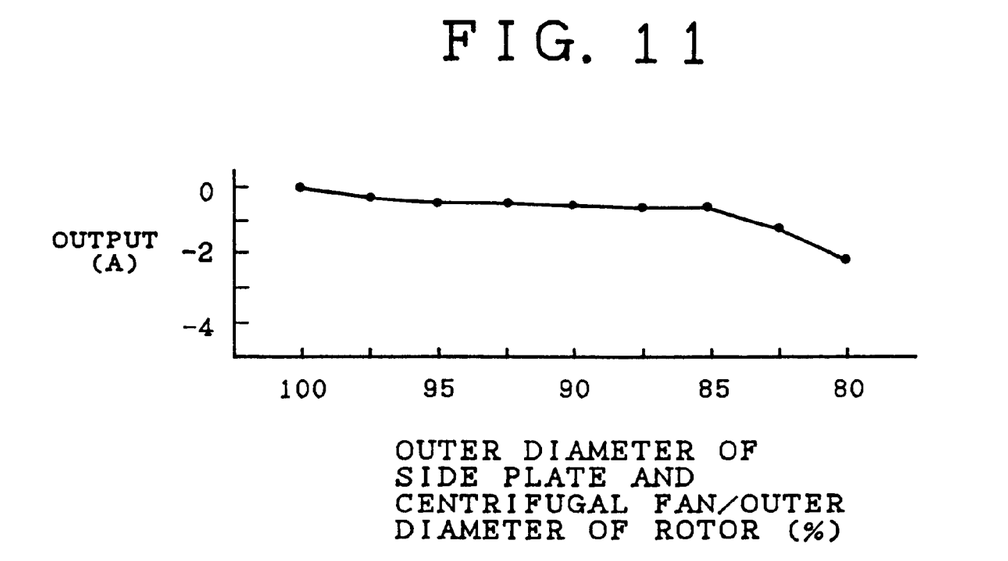
FIG. 11 is a graph showing a result of measurement of the output in the embodiment 1 of the present invention.
Figure 12:
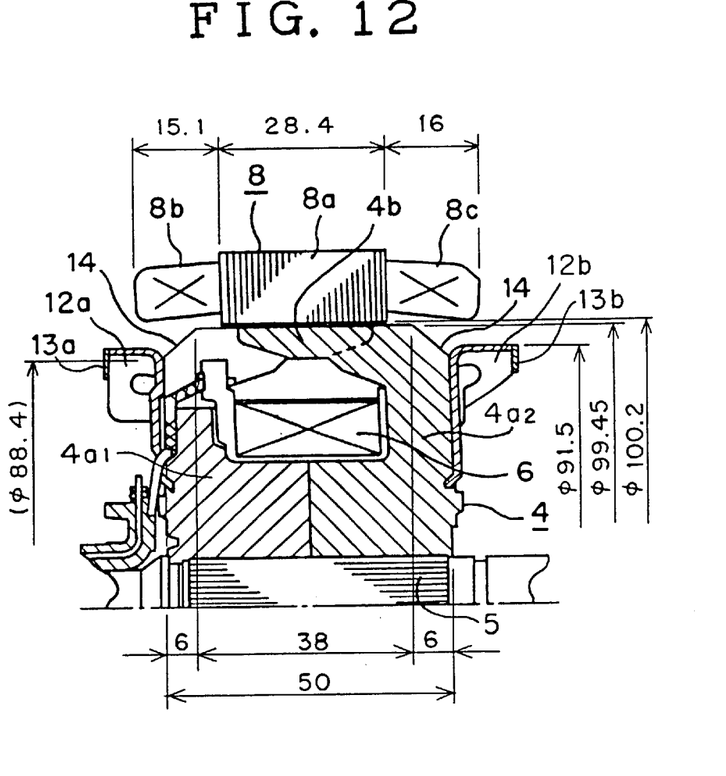
FIG. 12 is a diagram showing the relation between a stator coil and a rotor core and a detail size of each portion in the vehicular AC generator according to the embodiment 1 of the present invention.

Here. the result of measurement of the wind noise and the output in the vehicular AC generator according to the present invention are illustrated in FIG. 10 and FIG. 11. In the measurement, the size of each portion is set as shown in FIG. 12. The outer diameter (φ91.5) of each of the side plates 13a and 13b and each of the centrifugal fans 12a and 12b with respect to the outer diameter (φ100.2) of each of the cores 4a1 and 4a2 is set to be in the range of 100% to 80% (corresponding to φ100.2 to φ80.16 in FIG. 12), and each measured value is compared with a reference value which is obtained when the outer diameter of each of the side plates 13a and 13b and each of the centrifugal fans 12a and 12b with respect to the outer diameter of each of the cores 4a1 and 4a2 is set to be 100% (corresponding to φ100.2 in FIG. 12). According to this result, the overall values of the wind noise is gradually decreased when the outer diameter of each of the side plates 13a and 13b and each of the centrifugal fans 12a and 12b with respect to the outer diameter of each of the cores 4a1 and 4a2 becomes smaller than 96% (corresponding to φ96.192 in FIG. 12). The output is not largely changed as long as the outer diameter of each of the side plates 13a and 13b and each of the centrifugal fans 12a and 12b with respect to the outer diameter of each of the cores 4a1 and 4a2 is in the range between 100% and 85%, however, the output is gradually lowered when it is smaller than 85% (corresponding to φ85.17 in FIG. 12). From these results, it is preferable to set the outer diameter of each of the side plates 13a and 13b and each of the centrifugal fans 12a and 12b with respect to the outer diameter of each of the cores 4a1 and 4a2 to be in the range between 96% and 85% (corresponding to φ96.192 to φ85.17 in FIG. 12).

It should be noted that, in FIG. 12, the size of each portion is expressed by the unit of millimeter. Also, it should be noted that a rectangular step (having a height of φ0.75 mm) is formed between the outer diameter (φ100.2 mm) of each of the cores 4a1 and 4a2 of the rotor 4 and the starting point of the sloping surface of each tapered portion 14. By the provision of the step, the life time of the cool forging metal mold of the claws 4b can be elongated.

Figure 13:
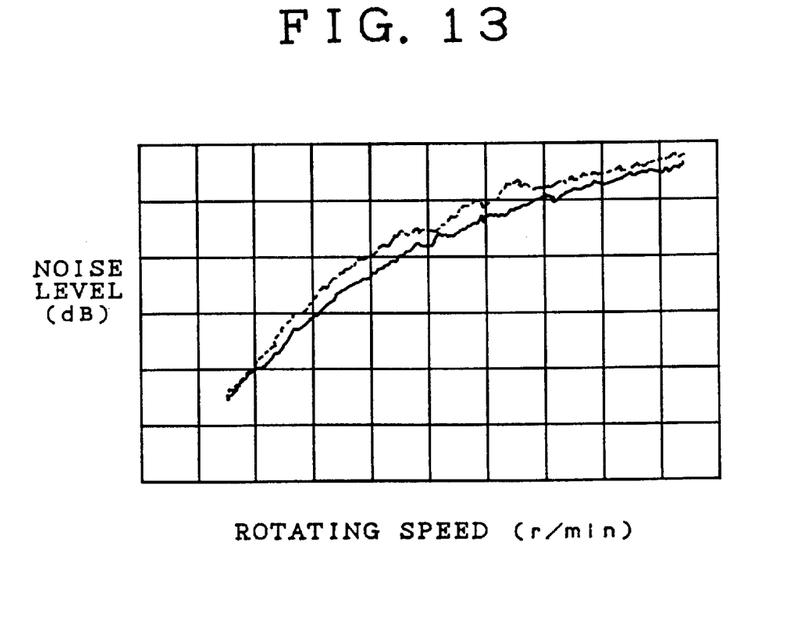
FIG. 13 is a graph showing a comparison of wind noises in the embodiment 1 of the present invention and in the prior art example.

The comparison of the overall values of wind noise between the vehicular AC generator of this embodiment and the prior art AC generator is shown in FIG. 13, in which a solid curve represents the embodiment and a broken curve represents the prior art example.

Embodiment 2

In the above-described embodiment 1, the side plates 13a and 13b are fixed to the centrifugal fans 12a and 12b, however, the side plates 13a and 13b may be omitted. When the side plates 13a and 13b are omitted, the increase in the amount of wind by means of the side plates 13a and 13b can not be expected, however, in addition to the effect to further reduce the noise due to the fans themselves, the effect to reduce the noise generated between the fans and the coil ends when the fans are rotated can be obtained as in the above-described first embodiment 1.

It should be noted that the centrifugal fan 12a or 12b and the side plate 13a or 13b may be provided at one side of the cores 4a1 and 4a2, and the prior art centrifugal fan may be provided at the other side. In this case, the effect will be reduced to some extent when compared with the above-described embodiment 1, however, the effect derived from the one centrifugal fan and the side plate is the same as the effect derived from the one centrifugal fan and the side plate in the above-described embodiment 1.

Embodiment 3

Figure 14:
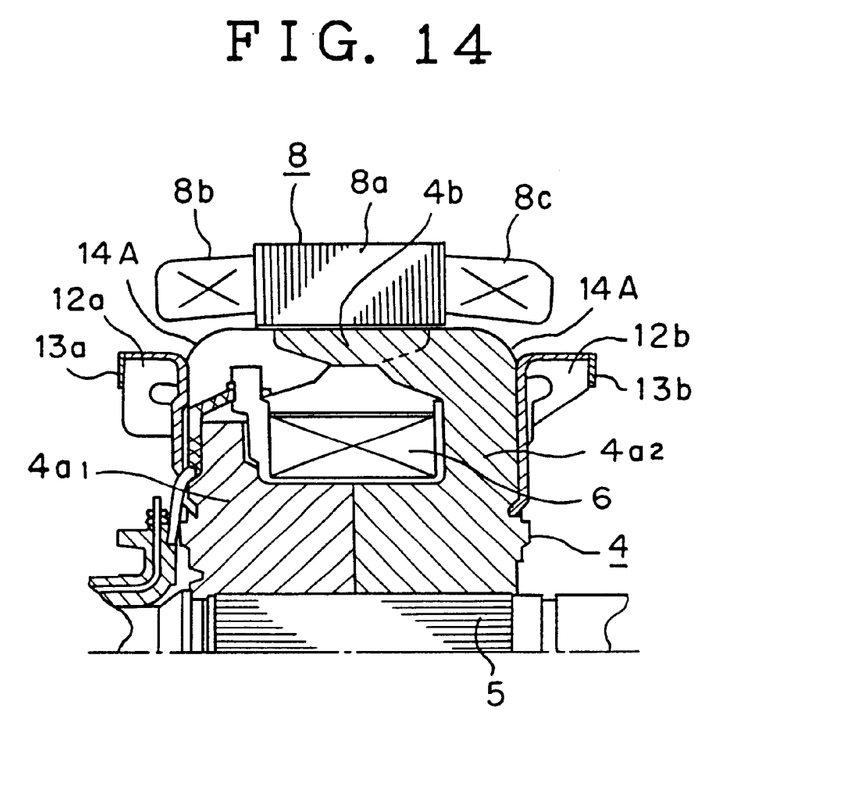
FIG. 14 is a cross-sectional view showing a relation between a stator coil and a rotor core in an embodiment 3 of the present invention.
Figure 15:
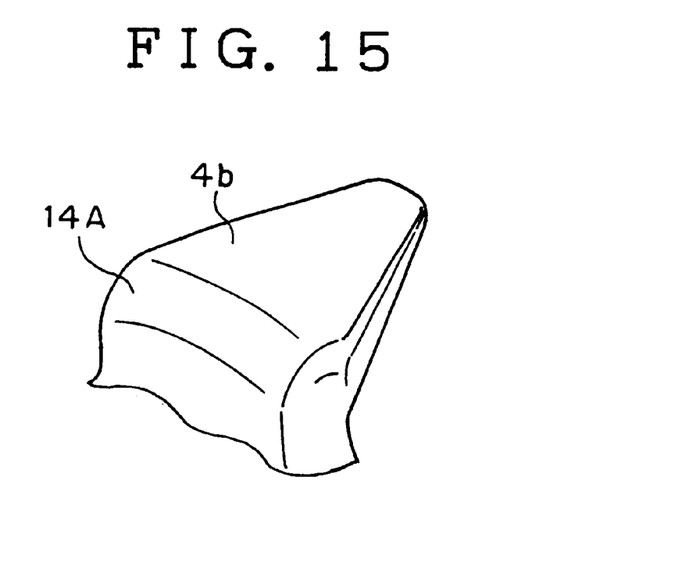
FIG. 15 is a perspective view showing a claw of the rotor core in FIG. 14.

In the above-described embodiment 1, the tapered portion 14 formed by the claw 4b is illustrated as a sloping surface, however, it may be a tapered portion 14A formed by a curved surface as illustrated in FIG. 14 and FIG. 15.

Embodiment 4

Figure 16:
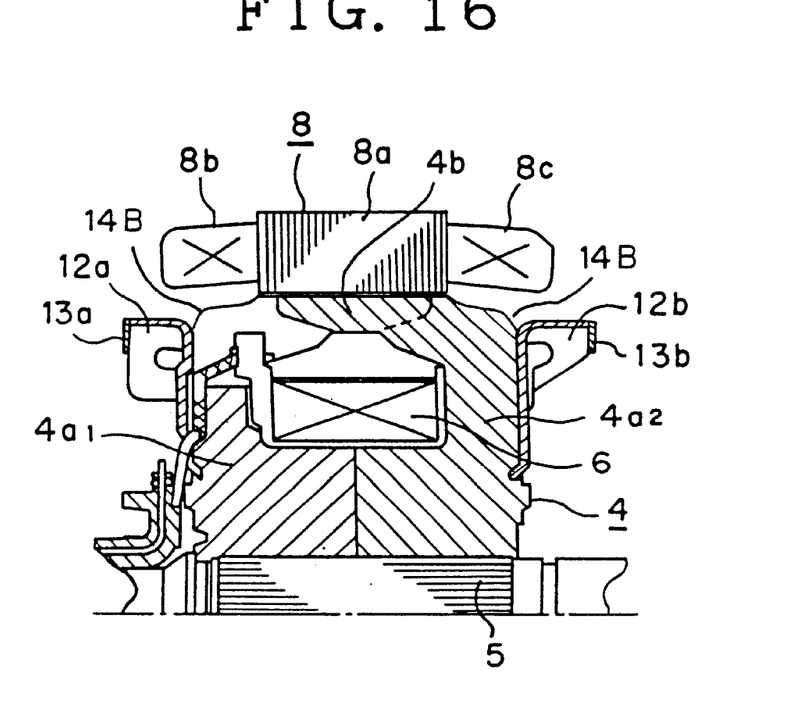
FIG. 16 is a cross-sectional view showing a relation between a stator coil and a rotor core in the embodiment 4 of the present invention.
Figure 17:
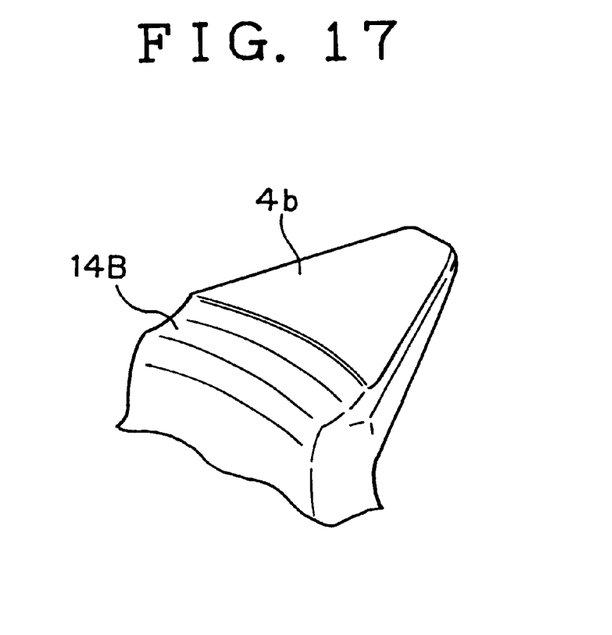
FIG. 17 is a perspective view showing a claw of the rotor core in FIG. 15.

Alternatively, as illustrated in FIG. 16 and FIG. 17, it may be a tapered portion 14B formed by two sloping surfaces between which a step is provided. In this case, since the step in the tapered portion 14B suppresses the influence of the magnetic flux , the output current is not largely lowered so that the noise caused by cutting the wind between the fans and the coil ends can be reduced.

Embodiment 5

Figure 18:
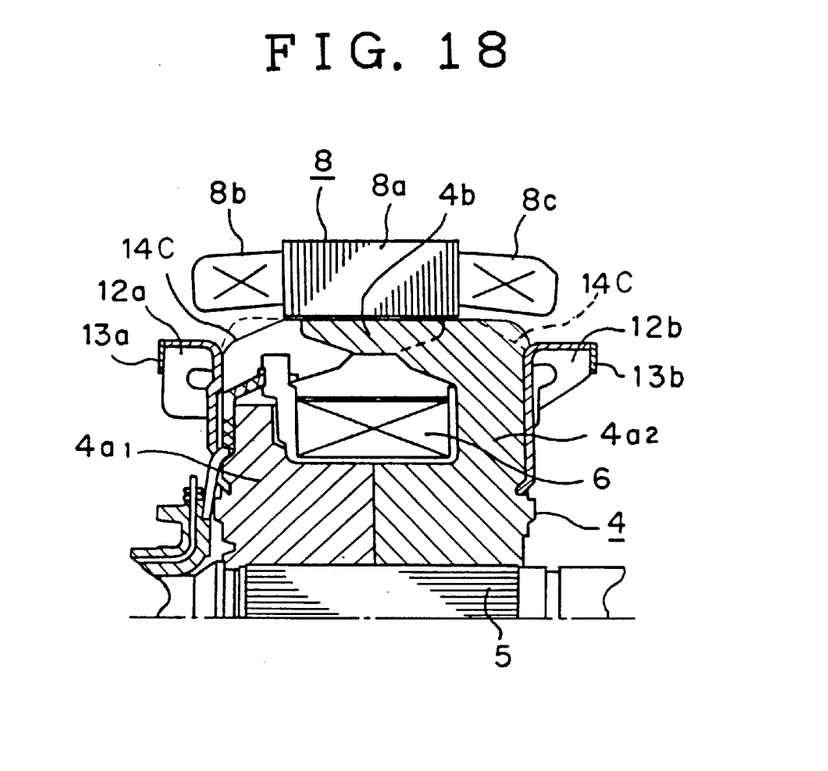
FIG. 18 is a cross-sectional view showing a relation between a stator coil and a rotor core in the embodiment 5 of the present invention.
Figure 19:
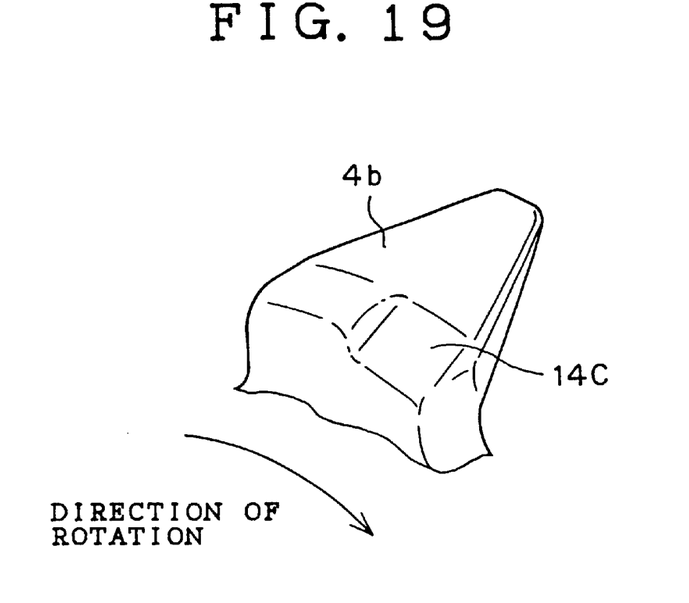
FIG. 19 is a perspective view showing a claw of the rotor core at the front side in FIG. 18.
Figure 20:
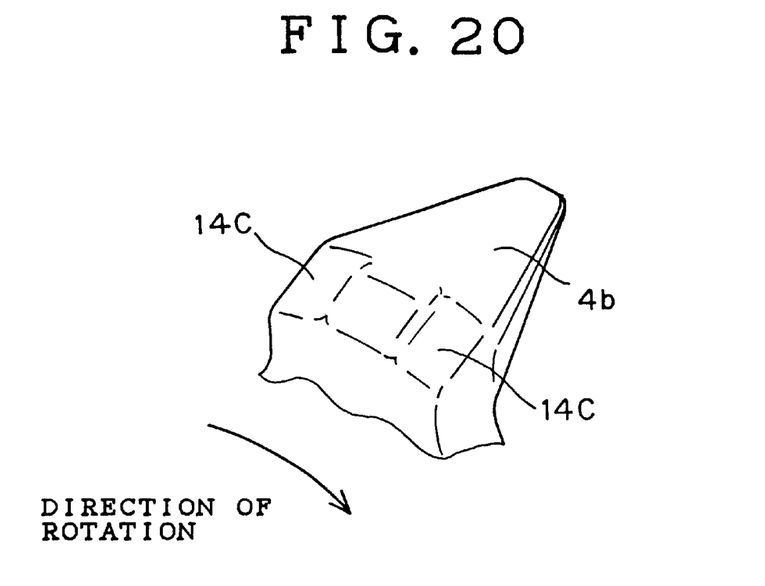
FIG. 20 is a perspective view showing a claw of the rotor core at a different front side in the embodiment of the present invention.

In the above-described embodiments 1 to 4, each of the tapered portions 14, 14A, and 14B is formed in the full width of the circumferential width of the claw 4b, however, a tapered portion 14C may be formed in at least front side in the direction of rotation in the circumferential width of the claw 4b. For example, as illustrated in FIG. 18 and FIG. 19, the tapered portion 14C is formed in the front-half portion in the circumferential width, or as illustrated in FIG. 20, the tapered portions 14C are formed in both the front and the rear portions in the width in the circumferential direction.

By making the tapered portions 14C as parts of the claw 4b in the circumferential width, the decrease in the outer diameters of the rotor 4 can be limited, and accordingly, the lowering of the output current can be prevented. It is a matter of course that the noise caused by cutting wind between the fans and the coil ends 8b and 8c can be reduced due to the presence of the tapered portions 14C. It is also a matter of course that each of the shapes of the surfaces of the tapered portions 14C may be any one of the sloping surface, curved surface, and two slope surfaces having a step.

As described above, according to the present invention, since the outer diameter of the centrifugal fan is made to be smaller than the outer diameter of the core, there is an effect in that the noise caused by cutting wind during rotating the centrifugal fan can be reduced.

Further, according to the present invention, nevertheless of the decrease of the outer diameter of the centrifugal fan, there is an effect in that the cooling efficiency of the coil end of the stator by means of the centrifugal fan is not lowered.

Still further, according to the present invention, since the lowering of the output current due to the decrease of the outer diameter of the stator core is made to be smaller, there is an effect in that the noise caused by cutting wind by means of the core can be made small.

What is claimed is:

1. A vehicular AC generator, comprising:
   a rotor supported by a rotating shaft and a stator arranged on an outer periphery of said rotor, said stator having stator coil ends;
   a pair of cores included in said rotor and supported by said rotating shaft, and having a plurality of trapezoidal-shaped claws as magnetic poles protruding on the outer peripheral edges of said pair of cores and alternately arranged in such a way that each of said claws coupled to one of said pair of cores is arranged in a concave portion between adjacent said claws coupled to the other of said pair of cores;

a pair of fans attached to the front side and the rear side of said cores, at least one of said fans having an outer surface forming an outer diameter in the range between 85% and 96% of the outer diameter of each of said cores; and a side plate fixed to an end portion of a blade of at least one of said pair of fans, said side plate having an outer diameter equal to or smaller than the outer diameter of said at least one of said pair of fans;

each of said claws having a tapered portion for gradually decreasing the outer diameter of a shoulder portion of said claw in the direction toward an end surface of said core so that the outer diameter of at least one of said cores faced to said at least one of said fans becomes substantially the same as the outer diameter of said at least one of said fans and a gap is formed between said at least one of said fans and a corresponding one of said stator coil ends along a corresponding one of said tapered portions.

2. A vehicular AC generator as claimed in claim 1, wherein said tapered portion has a slope surface.

3. A vehicular AC generator as claimed in claim 2, wherein said tapered portion formed in said claw is provided in at least a front side of the direction of rotation in a circumferential width of said claw.

4. A vehicular AC generator as claimed in claim 1, wherein said tapered portion has a curved surface.

5. A vehicular AC generator as claimed in claim 4, wherein said tapered portion formed in said claw is provided in at least a front side of the direction of rotation in a circumferential width of said claw.

6. A vehicular AC generator as claimed in claim 1, wherein said tapered portion has two slope surfaces and a step arranged between said two slope surfaces.

7. A vehicular AC generator as claimed in claim 6, wherein said tapered portion formed in said claw is provided in at least a front side of the direction of rotation in a circumferential width of said claw.

8. A vehicular AC generator as claimed in claim 1, wherein said tapered portion formed in said claw is provided in at least a front side of the direction of rotation in a circumferential width of said claw.

9. A vehicular AC generator as claimed in claim 8, wherein said tapered portion is formed only in said front side of the direction of rotation.

10. A vehicular AC generator as claimed in claim 8, wherein said tapered portion includes a front portion formed in said front side of the direction of rotation, and a rear portion formed in a rear side of the direction of rotation in a circumferential width of said claw, and a step portion is formed between said front and rear portions.

11. A vehicular AC generator as claimed in claim 1, wherein said tapered portion formed in said claw is provided in at least a front side of the direction of rotation in a circumferential width of said claw.

12. A vehicular AC generator as claimed in claim 1, wherein the entirety of the outer diameter is within the range between 85% and 96% of the outer diameter of each of said cores.

13. A vehicular AC generator as claimed in claim 1, wherein the outer diameter of said at least one of said fans is 92% of the outer diameter of each of said cores.

* * * * *